United States Patent

Crockett et al.

[11] Patent Number: 5,987,251
[45] Date of Patent: Nov. 16, 1999

[54] AUTOMATED DOCUMENT CHECKING TOOL FOR CHECKING SUFFICIENCY OF DOCUMENTATION OF PROGRAM INSTRUCTIONS

[75] Inventors: Burt Larue Crockett; Robert Michael Bimm; Wilbur W. Goolsby; Debra P. Story, all of Colorado Springs, Colo.

[73] Assignee: MCI Communications Corporation, Washington, D.C.

[21] Appl. No.: 08/922,388

[22] Filed: Sep. 3, 1997

[51] Int. Cl.$^6$ .................................................. G06F 9/45
[52] U.S. Cl. ........................ 395/704; 395/705; 395/709; 395/710
[58] Field of Search .................. 395/701, 702, 395/704, 709; 371/27.1; 702/123

[56] References Cited

U.S. PATENT DOCUMENTS

| | | | |
|---|---|---|---|
| 5,359,546 | 10/1994 | Hayes et al. | 702/123 |
| 5,426,651 | 6/1995 | Van De Burgt | 371/27.1 |
| 5,450,586 | 9/1995 | Kuzara et al. | 395/704 |
| 5,675,803 | 10/1997 | Preisler et al. | 395/704 |
| 5,778,230 | 7/1998 | Wimble et al. | 395/704 |
| 5,812,843 | 9/1998 | Yamazaki et al. | 396/670 |
| 5,812,850 | 9/1998 | Wimble | 395/704 |
| 5,838,975 | 11/1998 | Abramson et al. | 395/704 |
| 5,862,381 | 1/1999 | Advani et al. | 395/704 |
| 5,896,536 | 4/1999 | Lindsey | 395/704 |

OTHER PUBLICATIONS

Heimdal et al., "Completeness and consistency analysis of state based requirments", ICSE ACM, pp. 3–14, Jan. 1995.

Dharap et al., "Information agents for automated brosing", CIKM ACM, pp. 296–305, Aug. 1996.

Heitmeyer et al., "Automated consistency checking of requirments specifications", ACM Trans. soft. Eng & Methd. vol. 5, No. 3 pp. 231–261, Jul. 1996.

Tom Schorsch, CAP: An automated self assessment tool to check pascal programs for syntax, logic and style errors, SIGCSE ACM, pp. 168–172, Mar. 1995.

*Primary Examiner*—Tariq R. Hafiz
*Assistant Examiner*—Anil Khatri

[57] ABSTRACT

A tool performs automated documentation checking of program instructions written in a scripting language, such as Job Control Language JCL. The tool checks whether each of the identified procedures, programs and data definitions are properly documented. The tool operates by first processing the JCL instructions to identify what documentation should be included for the job and then processing the documentation to determine how it compares with what documentation should be included for the job. If the documentation is not complete and accurate, the tool produces error codes to identify the errors. The tool may prevent a job from being processed until it is properly documented. The tool may include a bypass mechanism that enables the job to be processed despite the tool not being properly documented.

18 Claims, 5 Drawing Sheets

| Element /64 | Text /66 |
|---|---|
| Job Name | "Job Name:" |
| Job Step Name | "Job Step Name:" |
| Proc Step Name | "Proc Step Name:" |
|  |  |

Documentation Format Information ⟍62

AUTOMATED DOCUMENT CHECKING TOOL FOR CHECKING SUFFICIENCY OF DOCUMENTATION OF PROGRAM INSTRUCTIONS

TECHNICAL FIELD

The present invention relates generally to data processing systems and more particularly to an automated documentation checking tool for checking the sufficiency of documentation of program instructions.

BACKGROUND OF THE INVENTION

Job Control Language (JCL) is a script language developed by International Business Machines Corporation to control execution of programs and batch systems run on the IBM MVS mainframe system. JCL includes scripts that tell a job controller what to do when the job controller attempts to run a job. JCL programs include a series of instructions that are typically placed at the beginning of a job to specify how the mainframe system should process the job. The instructions may specify computer resource allocations, the identity of physical and logical resources to which output data is to be written and the identity of physical and logic resources from which input data is to be received. The instructions are organized sequentially in the order in which they are to be executed.

Each JCL job controls a production job stream that consists of a series of software programs that perform some business process. Typically, production control personnel monitor the progress of a job stream to ensure the job stream is completed as intended. The production control personnel take action when a JCL job step exhibits an abnormal condition. The documentation for the job identifies what actions are to be taken in response to such an abnormal condition. For example, the actions may include restarting a job step or paging on-call support personnel.

A JCL job is typically kept in a separate partitioned data set relative to the documentation. Oftentimes, the documentation data set has the same name as the JCL job data set but is placed in a separate library. Hence, if the production control personnel need to reference documentation for a JCL job, they may search for the data set with the same name as the JCL job that is in the documentation library.

Unfortunately, JCL job documentation is often inconsistent, inaccurate or absent. In many instances, the JCL job documentation is kept in a freeform style of textual notes written by software developers. The difficulty with this lack of consistency in the documentation is that it makes it difficult for production control personnel to accurately respond to abnormal conditions. As a result, delays in job processing may occur, resulting in a loss of time and income.

SUMMARY OF THE INVENTION

The present invention provides a tool for performing automated documentation checking of JCL instructions. The tool checks that each of the procedures, programs and data definitions in the JCL instructions is properly documented. The tool processes JCL instructions for a job to identify what documentation should be included for the job. The tool then processes the documentation that is provided for the job to ensure that the documentation is complete and accurate. If the documentation is not complete and accurate, the tool produces error codes that identify the nature of the error. The tool may also prevent a job from being processed until it is properly documented. Nevertheless, the tool may include a bypass mechanism that enables the job to be processed despite the presence of documentation deficiencies.

In accordance with a first aspect of the present invention, a method is practiced in a computer system that runs jobs. Program instructions are provided for controlling the running of a job on the computer system. Documentation is provided for the program instructions. An automated documentation checker is provided for checking sufficiency of the documentation for the program instructions. The automated documentation checker is then used to check the sufficiency of the documentation for the program instruction, and output is generated from the checker that indicates whether the documentation is sufficient.

In accordance with another aspect of the present invention, a method is practiced in a data processing system that processes jobs. The data processing system includes at least one job and programming instruction and a scripting language that specifies how the job is to be processed. Documentation is provided for the program instructions. A tool is provided for verifying that a documentation is proper. Information is input to the tool to identify a documentation format that is proper. The documentation is processed with the tool to verify whether the documentation is proper. The tool uses the input information in performing the processing, and output is generated from the tool that indicates whether the documentation is proper.

In accordance with an additional aspect of the present invention a computer system includes a job with JCL instructions and documentation for the JCL instructions. The JCL instructions are processed to identify documentation that is proper for the instructions. The documentation is processed in view of what documentation has been identified as proper for the JCL instructions to determine whether the documentation is proper. An output indicating whether the documentation is proper is generated.

BRIEF DESCRIPTION OF THE DRAWINGS

An illustrative embodiment of the present invention will be described below relative to the following figures.

DETAILED DESCRIPTION OF THE INVENTION

The illustrative embodiment of the present invention provides an automated documentation checker that acts as a tool for checking the sufficiency of documentation for JCL jobs. The documentation checker tool verifies that each JCL job step is sufficiently and correctly documented. In the illustrative embodiment, the documentation checker tool is automatically invoked during migration of a program to a production library. The tool accepts documentation format information as input for specifying the proper format of documentation for JCL job steps. This input acts like a template that identifies the proper documentation format.

The documentation checker tool is automated so as to relieve a program developer of the burden of ensuring that all of the documentation is proper. The documentation checker tool ensures that JCL jobs are consistently documented in a desired fashion. The tool also ensures that the documentation is correct and complete. As will be described in more detail below, the tool may generate reports that detail the results of the validation process.

Figure 1:
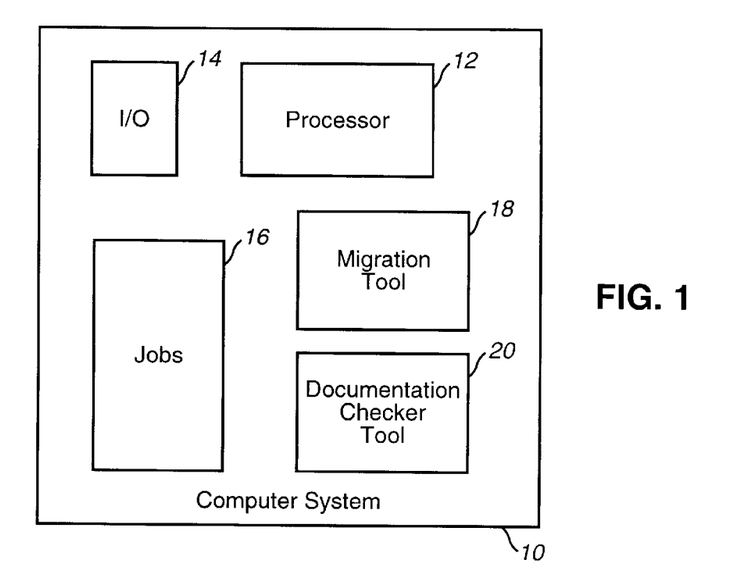
FIG. 1 is a block diagram of a computer system that is suitable for practicing the illustrative embodiment of the present invention.

FIG. 1 is a block diagram of a computer system 10 that is suitable for practicing the illustrative embodiment of the present invention. The computer system 10 includes at least one processor 12 for processing program instructions. The computer system 10 may also include a number of input/output (I/O) devices 14, such as display devices, printers, keyboards, mice, modems, loudspeakers, and other peripheral devices. The processor 12 processes jobs 16. The processor 12 may also execute a number of other programs, including a migration tool 18 and a documentation checker tool 20. The migration tool 18 is responsible for migrating jobs through libraries maintained within the computer system 10 until the jobs are ready to be placed into production. The migration tool 18 is useful for developers to assist them in proper software development. The documentation checker tool 20 performs the automated documentation checking that will be described in more detail below. A suitable computer system for practicing the illustrative embodiment of the present invention. It is an IBM MVS mainframe computer system.

Those skilled in the art will appreciate that the computer system configuration depicted in FIG. 1 is intended to be merely illustrative. Other computer system configurations may be used to practice the present invention. Moreover, the present invention is not limited to being practiced on a mainframe computer system but may also be practiced on personal computer systems, workstations and distributed systems.

Figure 2:
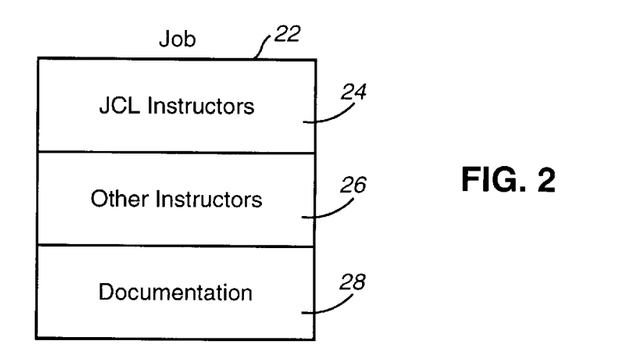
FIG. 2 shows the logical organization of a job.

FIG. 2 depicts the logical organization of a job 22. The job includes JCL instructions 24 that identify how the job is to be processed by the computer system 10. As was discussed in the Background of the Invention, the JCL instructions may identify physical and logical resources that are to be used in handling the job, resource allocation decisions and other related information. The job 22 also includes other instructions 26 for the programs that constitute the core of the job. These instructions 22 perform the business process of the job. Lastly, documentation 28 is provided for the job.

Figure 3:
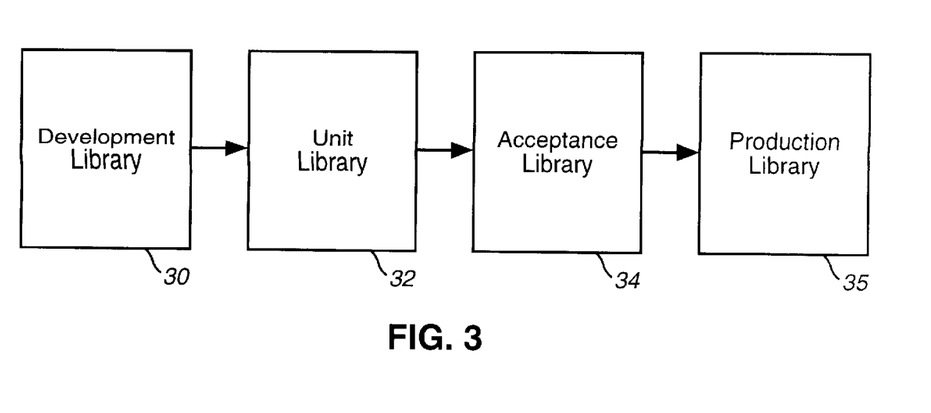
FIG. 3 illustrates the migration of jobs among libraries in the computer system.

When a software developer is developing a program that will become part of a job, the program resides initially in a development library 30 (FIG. 3). When development of the program is complete, the program may be migrated to a unit library 32 where a unit testing of the program is performed. After unit testing is completed and the program successfully passes the testing, the program is migrated to an acceptance library 34. In the acceptance library, the program may be tested in context with other programs 34. Hence, the entire job that encapsulates the program may be tested. If acceptance testing is properly completed, the job may be forwarded to the production library 35 where it is executed in a production environment.

The migration tool 18 migrates the program among the libraries 30, 32, 34 and 35. As will be explained in more detail below, the migration tool 18 invokes the documentation checker tool while a job is within the acceptance library 34. A suitable migration tool is ENDEVOR.

Figure 4:
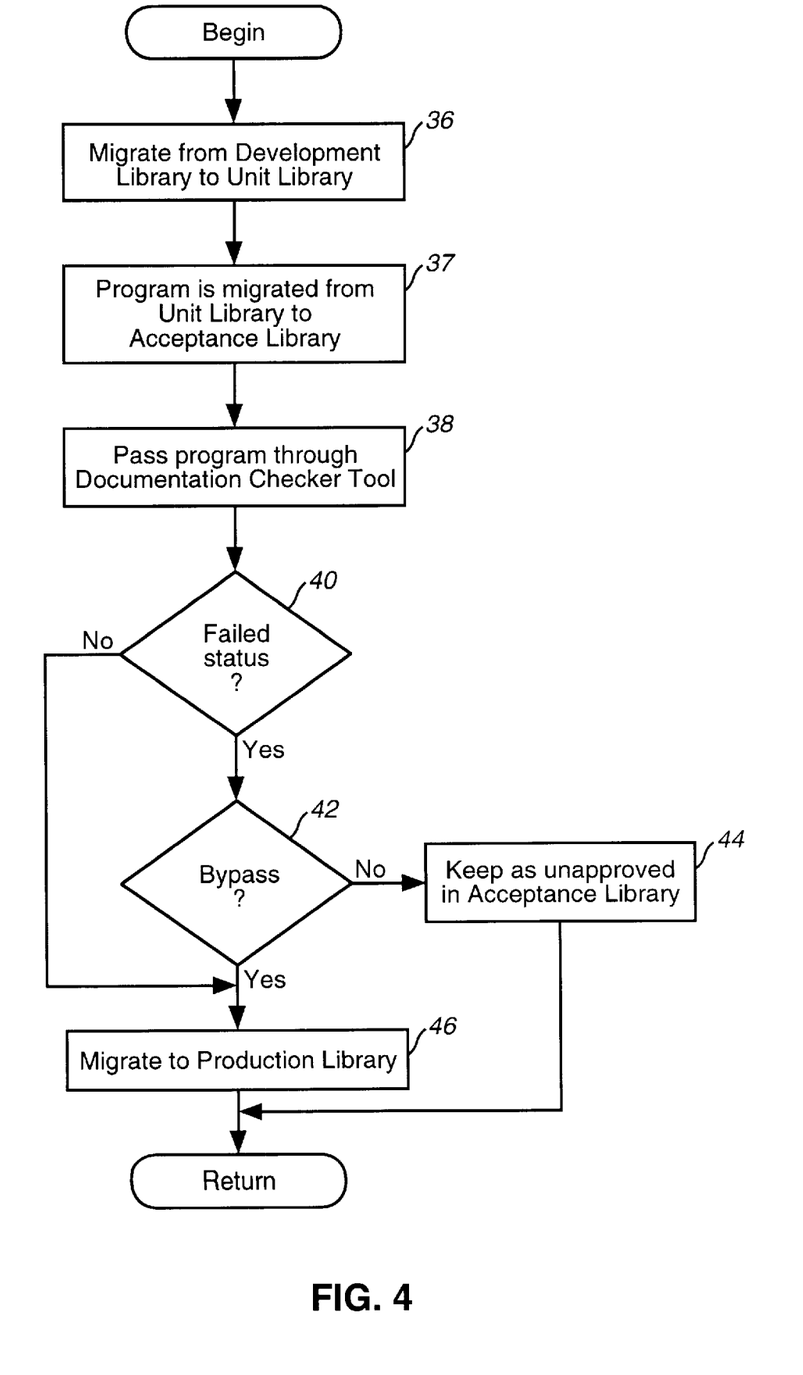
FIG. 4 is a flowchart illustrating the steps that are performed during migration of a job among the libraries.

FIG. 4 is a flowchart illustrating the steps that are performed during the migration of a program among the libraries shown in FIG. 3. Initially, the program is migrated from the development library 30 to the unit library 32 (step 36 in FIG. 4). Subsequently after unit testing is completed, the program is migrated from the unit library 32 to the acceptance library 34 (step 37 in FIG. 4). The migration tool 18 invokes the documentation checker tool 20 while the job is within the acceptance library 34 (step 38 in FIG. 4). The documentation checker tool produces output that indicates whether the job successfully passed documentation checking or failed. Hence, in step 40 of FIG. 4, it is determined whether a failed status is output by the documentation checker tool. If no failed status is output, the job may be migrated to the production library 35 (step 46 in FIG. 4). On the other hand, if the job has failed the checking performed by the documentation checker tool, the job may be kept as an unapproved job in the acceptance library (step 44 in FIG. 4). Whether the job is kept as unapproved in the acceptance library depends upon whether the bypass procedure is chosen by the production control personnel (see step 42 in FIG. 4). As was discussed above, the documentation checker tool 20 includes a bypass procedure for enabling a job to be passed to the production library 35 despite having documentation deficiencies. This bypass procedure is designed for instances wherein processing of the job is critical, such as when the job is one of great time urgency. When the bypass procedure is invoked, the job is migrated to the production library 35. Otherwise, the job is kept as an unapproved job in the acceptance library (see step 44 in FIG. 4) where the documentation changes that are needed may be made.

In order to gain an appreciation for how the documentation checker tool operates, it is helpful to review some of the basic syntax of JCL statements. In general, a JCL statement may begin with "//" in columns 1 and 2 of the statement. Columns 4–71 hold parameters or operands. If column 72 is not blank, the statement continues from the next line. Columns 73–80 may contain sequence numbers.

JCL statements may include different operation specifiers, including an EXEC operation for executing a program or procedure. An EXEC statement has the following format:

// EXEC [[PGM=]progname][,REAL][,SIZE=size][.GO] [.P where PROGNAME is the name of a program; REAL specifies that the program will be executed in real mode rather than virtual mode; SIZE indicates the amount of partition space to be allocated to the program; GO is used in load and go operations as part of compiler execution; and PARAM specifies parameters that are to be used by the program.

Alternatively, the EXEC statement alternatively may have the following format for causing a catalogue procedure to be executed:

// EXEC PROC=procname[,parname[=[value]]][. . . ]

where PROCNAME specifies the name of a catalogue procedure; and PARNAME specifies a symbolic parameter that is to be passed to the procedure.

JCL statements may also be DD statements. These are data definition statements that define certain types of data.

Figure 5:
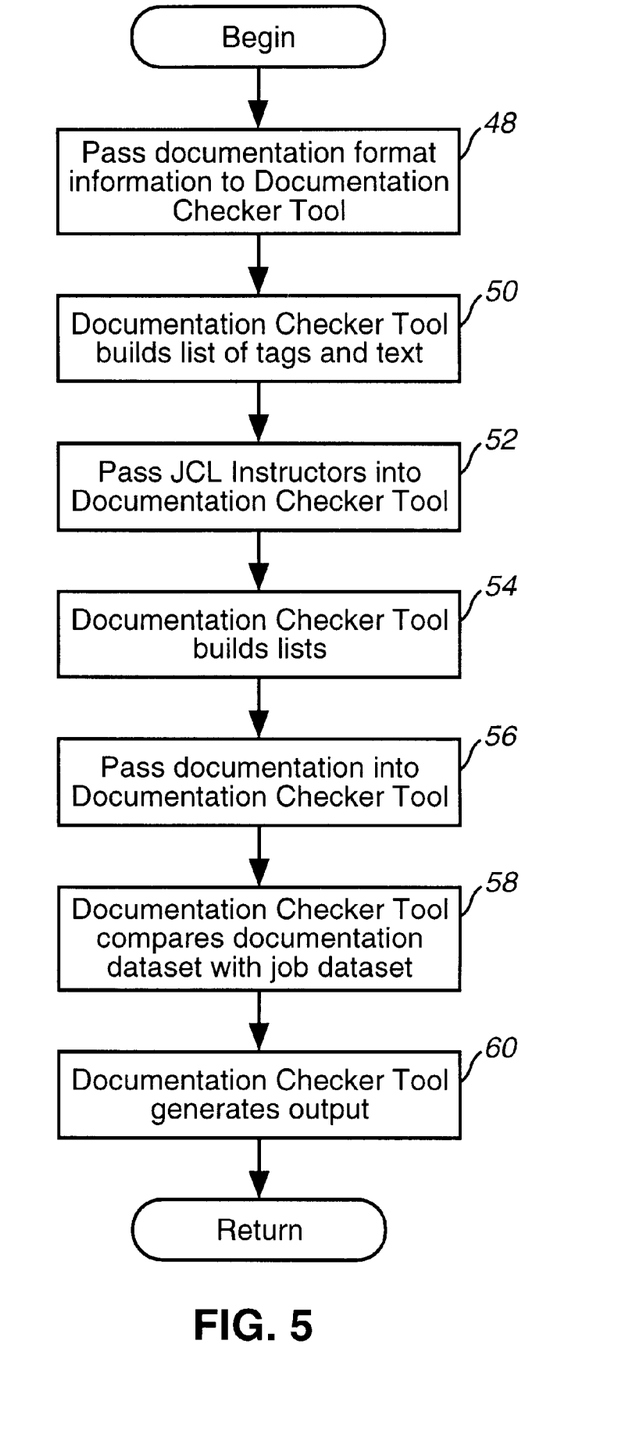
FIG. 5 is a flowchart illustrating the steps that are performed by the automated checker tool of the illustrative embodiment of the present invention.

FIG. 5 is a flowchart illustrating the steps that are performed by the documentation checker tool 20 in processing a given JCL job. Initially, documentation format information is passed to the documentation checker tool 20 to specify the appropriate format of documentation (step 48 in FIG. 5). As was discussed above, the documentation format information serves as a sort of template that identifies how procedures, programs and data definitions should be documented. An example of an appropriate documentation format is as follows:

```
**********************************************
RESTART SECTION.
JOB STEP NAME.................:
     (1)   PROC STEP NAME.............:
     (2)   PROGRAM NAME...............:
     (3)   ACCEPTABLE CONDITION
           CODE......................:
     (4)   ACTION TO TAKE IF AN
           ABNORMAL CONDITION CODE
           OR ABEND OCCURS IN
           THIS STEP.................:
END RESTART SECTION.
==============================================
SETUP SECTION.
(1)    JOB NAME ......................:
(2)    JOB NARRATIVE..................:
(3)    DATA CENTER ...................:
(4)    TYPE OF SUBMIT
       A.  SCHEDULED
           SUBMIT TIME...............:
           RUN FREQUENCY.............:
           DAY(S) RUN ...............:
           RUN ON HOLIDAYS...........:
       B.  TRIGGERED
           TRIGGERED BY..............:
           DAY(S) RUN ...............:
       C.  DEMANDED VIA NDM
           DEMANDED BY...............:
           DAY(S) RUN ...............:
       D.  ON DEMAND
           WHEN IS THIS JOB DEMANDED.:
(5)    IS 'ADABAS' USED..............:
       WHICH 'ADABAS' ...............:
       READ OR UPDATE ...............:
(6)    IS 'DB2' USED.................:
       WHICH SUBSYSTEM ..............:
       HOST LPAR ....................:
(7)    PREPROCESSING MANUAL
       INTERVENTION AND/OR
       SYSTEM REQUIREMENTS
       A)  MUST SYMBOLIC PARA-
           METER VALUES BE ENTERED
           BEFORE SUBMITTING THIS
           JOB.......................:
           IF YES, THEN SUPPLY
           APPROPRIATE INSTRUC-
           TIONS HERE................:
       B)  DOES THIS JOB REQUIRE
           ANY CICS FILES
           TO BE DOWN................:
           IF YES, WHICH CICS REGION.:
           IF YES, WHICH FILES.......:
           ARE THE FILES
           DEALLOCABLE FROM CICS.....:
       C)  OTHER REQUIREMENTS........:
(8)    ESTIMATED ELAPSED TIME............:
(9)    ESTIMATED CPU TIME............:
(10)   MANDATORY COMPLETION TIME.....:
       ACTION TO BE TAKEN IF
       THIS TIME CANNOT BE MET.......:
(11)   MAXIMUM TAPE DRIVES
       USED IN ANY ONE STEP..........:
(12)   HIGHEST ACCEPTABLE COND
       GENERATED BY THIS JOB.........:
(13)   DOES THIS JOB USE UCC11
       RESTART VIA UCC7 .............:
(14)   WHAT POST PROCESSING
       REQUIREMENTS MUST BE MET.....:
(15)   JOB SUCCESSORS
       A)  TRIGGERED JOBS -
           IF ANY JOBS ARE
           TRIGGERED BASED ON THE
           SUCCESSFUL COMPLETION
           OF THIS JOB LIST
           THEM HERE.................:
       B)  SUCCESSOR JOBS -
           IF ANY JOBS REQUIRE THE
           SUCCESSFUL COMPLETION
           OF THIS JOB, BUT ARE NOT
           TRIGGERED LIST THEM HERE..:
(16)   JOB DEPENDENCIES -
       A)  POSITIVE JOB DEPENDENCY -
           IF THIS JOB IS DEPENDENT
           UPON THE SUCCESSFUL COM-
           PLETION OF A PREDECESSOR
           JOB. BUT IS NOT TRIGGERED
           BY THE PREDECESSOR JOB(S).
           LIST THE PREDECESSOR JOB(S)..:
       B)  LIST THE LOOK BACK TIME FOR
           POSITIVE DEPENDENCIES.......:
       C)  NEGATIVE JOB DEPENDENCY -
           IF THIS JOB SHOULD NOT EXE-
           CUTE AT THE SAME TIME
           ANOTHER JOB(S) IS EXECUTING,
           LIST THE NEGATIVELY
           DEPENDENT JOB(S) HERE.......:
END SETUP SECTION.
==============================================
PRINTING AND DISTRIBUTION SECTION.
(1)    REPORT TITLE..............:
(2)    DEVICE ID.................:
(3)    DEVICE DESCRIPTION........:
(4)    MODE......................:
(5)    DESTINATION...............:
(6)    FORM......................:
(7)    TOTAL NUMBER OF COPIES....:
(8)    FREQUENCY OF REPORT.......:
(9)    SPECIAL INSTRUCTIONS .....:
END PRINTING AND DISTRIBUTION SECTION.
```

It should be appreciated that the example format set forth above is illustrative of how the documentation should appear and does not correspond directly with the documentation format information that is to be passed to the documentation checker tool 20.

Figure 6:
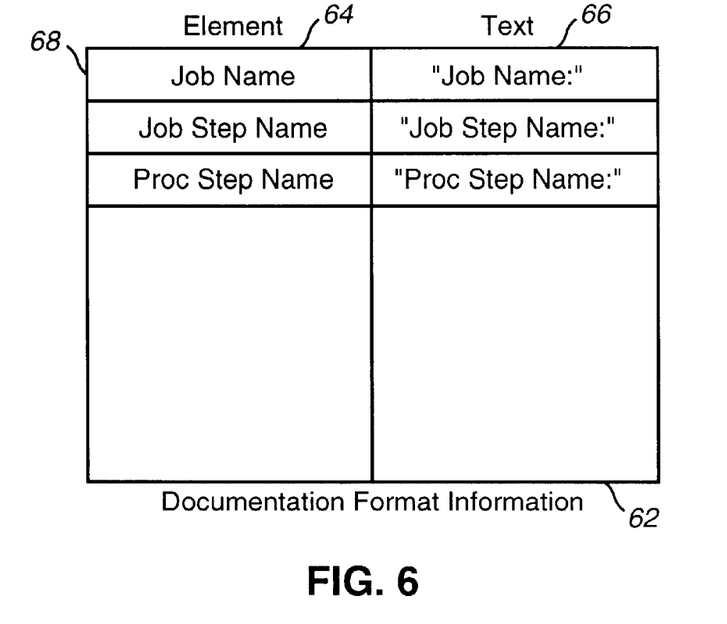
FIG. 6 illustrates the three lists that are generated by the tool in processing JCL instructions.

FIG. 6 illustrates an example of documentation format information 62 that is passed to the documentation checker tool 20. In particular, the documentation format information 62 has on each line 68 an element 64 and text 66. The element or tag indicates an element to be included in the documentation and the text 66 identifies the text that corresponds with the element for the given format. Hence, the job name element has the associated text "Job Name:". Accordingly, each of the desired elements may be identified within the documentation format information 62 to realize documentation like that specified above. The documentation checker tool 20 uses the documentation format information 62 that is input to it to build a list of tags and text (step 50 in FIG. 5).

Figure 7:
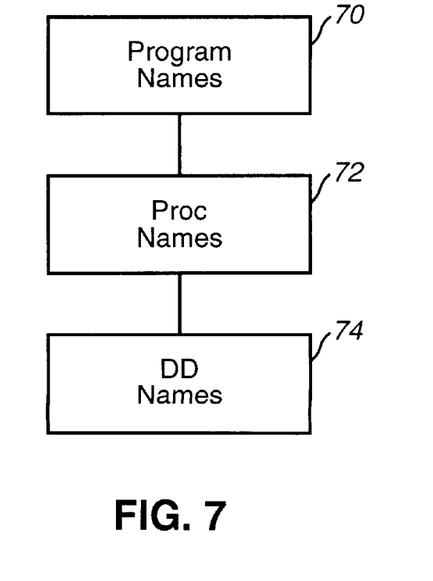
FIG. 7 illustrates the format of documentation format information that is fed into the tool.

The documentation checker tool 20 must next process the JCL instructions 24 in a job 22 in order to identify what elements need to be documented in the documentation that is to be checked (step 52 in FIG. 5). The documentation checker tool 20 processes the JCL instructions to build three lists 70, 72 and 74, as shown in FIG. 7. The program names list 70 contains a list of the program names that are identified within the JCL statements. The PROC names list 72 holds the name of procedures that are referenced within the JCL statements. Lastly, the DD names list 74 holds the names of data that is defined by DD statements within the JCL instructions for every program and procedure.

Figure 8:
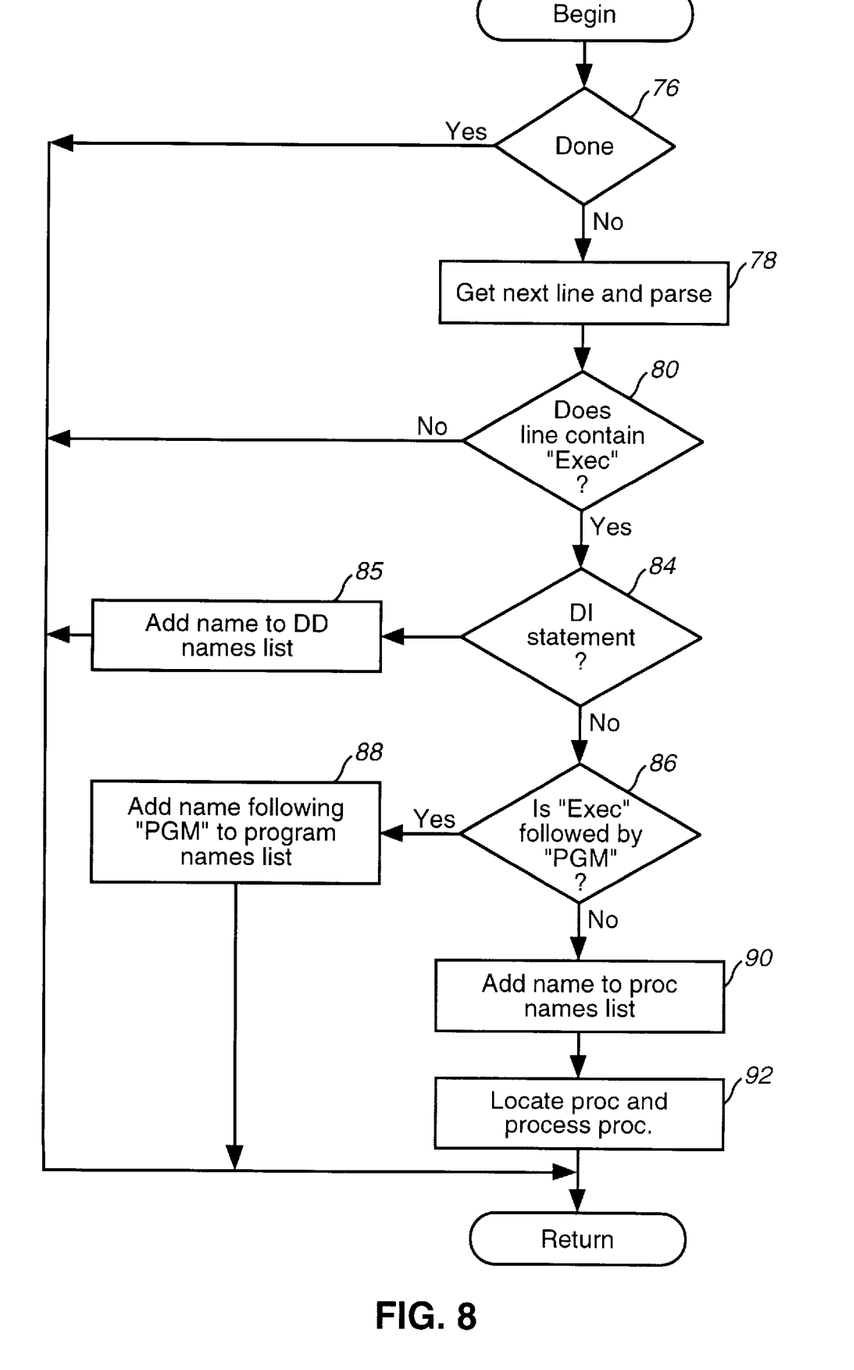
FIG. 8 illustrates the steps that are performed by the tool when processing JCL instructions.

FIG. 8 depicts the steps that are performed by the documentation checker tool in processing the JCL instructions 24 in more detail. The process is an iterative one where each line of the JCL instructions are processed. Accordingly, the iterative procedure initially checks whether it is done or not (step 76 in FIG. 8). If the process is not done, the next line of JCL instructions is processed (step 78 in FIG. 8). The processing constitutes parsing of the JCL instructions.

An error report may also be generated that identifies any errors. An example of an error report is as follows:

```
++++++++++++++++++++++++++++++++++++++++++++++++++++++++++++++++++++++++++++++++++++++++
                         +++++++++++++++++++++++++++ ERROR REPORT +++++++++++++++++++++++++++
++++++++++++++++++++++++++++++++++++++++++++++++++++++++++++++++++++++++++++++++++++++++
              ERROR--DOC: JS0010     PSOO20     IMDCAM   < >  JCL: JS0010     PS0020    IDCAMS
```

The documentation checker tool 20 looks to see if the line contains "EXEC" (step 80 in FIG. 8). If the line does not contain this statement, the process is repeated beginning with step 76. If the live contains "EXEC," the documentation checker tool 20 checks whether the line contains a DD statement (step 84 in FIG. 8). If the statement is a DD statement (i.e., "DD" follows "//" in the statement), the name of the data that is defined is added to the DD names list 74 (step 85 in FIG. 8). If the line contains "EXEC", the documentation checker tool 20 also checks whether "EXEC" is followed by "PGM" (step 86 in FIG. 8). If "PGM" follows "EXEC", it is an indication that a program name will follow "PGM". Accordingly, the program name that follows "PGM" is added to the program names list 70 (step 88 in FIG. 8). If "EXEC" is followed by "PROC" or, more generally, if "EXEC" is not followed by "PGM", it is an indication that a procedure name follows "EXEC". Hence, the procedure name is added to the PROC names list 72 (step 90 in FIG. 8). The procedure must also be processed. Therefore, the procedure name is used to locate the procedure and the body of the procedure is processed in a like fashion beginning with step 76 (step 92 in FIG. 8). In other words, a recursive process is initiated for the procedure.

Once the above-described steps of FIG. 8 are completed, step 54 of FIG. 5 is completed as well. The documentation checker tool 20 must then process the documentation that is provided for the job. The documentation is passed into the documentation checker tool (step 56 in FIG. 5). The documentation checker tool uses the documentation format information 62 (FIG. 6) to locate elements within the documentation by identifying the text 66 that is associated with the elements. This is then compared with the lists 70, 72 and 74 that were derived by processing the JCL statements to determine whether the documentation is present, complete and accurate (step 58 in FIG. 5). The documentation checker tool performs the comparison for each of the elements that needs to be documented in the JCL instructions. As a result of this comparison, the documentation checker tool 20 verifies whether each of the elements is properly documented or not. This verification is identified in the output that is generated by the documentation checker tool 20 (step 60 in FIG. 5).

The documentation checker tool may generate a comparison report that compares the JCL data set with the documentation data set. An example of this report is as follows:

While the present invention has been described with reference to a preferred embodiment thereof, those skilled in the art will appreciate that various changes in form and detail may be made without departing from the intended scope of the present invention as defined in the appended claims. For example, the present invention may be practiced with program instructions written in languages other than JCL.

We claim:

1. In a computer system, which includes partitioned data sets, for running jobs, a method comprising the steps of:

providing program instructions for controlling the running of a job on the computer system and documentation for the program instructions, the program instructions are kept in a first member of a given data set and the documentation for the program instructions are kept in a second member of the given data set;

providing an automated documentation checker for checking sufficiency of the documentation for the program instructions;

with the automated documentation checker, checking sufficiency of the documentation for the program instructions; and generating an output from the automated documentation checker that indicated the sufficiency of the documentation for the program instructions.

2. The method of claim 1 wherein the program instructions control batch processing of jobs.

3. The method of claim 1 wherein the program instructions are job control language (JCL) instructions.

4. The method of claim 1 wherein when the documentation is insufficient, an error output is generated.

5. The method of claim 4 wherein the error output identifies where the documentation is insufficient.

6. The method of claim 1, further comprising the step of preventing the job from being run when the output from the automated documentation checker indicates that the documentation for the program instructions is insufficient.

7. The method of claim 6, further comprising the steps of providing a bypass for enabling the program instructions to be run even when the output from the automated documentation checker indicates that the documentation is insufficient.

| JOB-STEP | PROC-STEP | PROGRAM | | JOB-STEP | PROC-STEP | PROGRAM |
|---|---|---|---|---|---|---|
| DOC: | JS0010 | PS0010 | DMBATCH | JCL: | JS0010 | PS0010 | DMBATCH |
| DOC: | JS0010 | PS0015 | DMBATCH | JCL: | JS0010 | PS0015 | DMBATCH |
| DOC: | JS0010 | PS0020 | IMDCAMS | JCL: | JS0010 | PS0020 | IDCAMS |
| DOC: | JS0010 | PS0030 | DMBATCH | JCL: | JS0010 | PS0030 | DMBATCH |

8. In a computer system, which includes partitioned data sets, for running jobs, a computer-executable instructions for performing a method comprising the steps of:

provide program instructions for controlling the running of a job on the computer system and documentation for the program instructions, the program instructions are kept in a first member of a given data set and the documentation for the program instructions are kept in a second member of the given data set;

providing an automated documentation checker for checking sufficiency of the documentation for the program instructions;

with the automated documentation checker, checking sufficiency of the documentation for the program instructions; and generation an output from the automated documentation checker that indicates the sufficiency of the documentation for the program instructions.

9. The computer-readable medium of claim 8 wherein the program instructions control batch processing of jobs.

10. The computer-readable medium of claim 8 wherein the program instructions are job control language (JCL) instructions.

11. The computer-readable medium of claim 8 wherein when the documentation is insufficient an error output is generated.

12. The computer-readable medium of claim 11 wherein the error output identifies where the documentation is insufficient.

13. The computer-readable medium of claim 8 wherein the method further comprises the step of preventing the job from being run when the output from the automated documentation checker indicates that the documentation for the program instructions is insufficient.

14. The computer-readable medium of claim 13 wherein the method further comprises the steps of providing a bypass for enabling the program instructions to be run even when the output from the automated documentation checker indicates that the documentation is insufficient.

15. In a data processing system that processes jobs, said system including at least one job, program instructions in a scripting language for specifying how the job is to be processed and documentation for the program instructions, a method comprising the steps of:

providing a tool for verifying that the documentation is proper;

inputting information to the tool that identifies a documentation format that is proper;

processing the documentation with the tool to verify whether the documentation is proper, said tool using the input information in verifying whether the documentation is proper;

generating output from the tool that indicates whether the documentation is proper;

preventing the job from being processed when the output from the tool indicates that the documentation is not verified as proper; and providing a bypass for enabling the job to be processed when the output form the tool indicates that the documentation is not verified as proper.

16. The method of claim 15 wherein the program instructions are job control language (JCL) instructions.

17. In a data processing system that processes jobs, said system including at least one job, program instructions in a scripting language for specifying how the job is to be processed and documentation for the program instructions, a computer-readable medium holding computer-executable instructions for performing a method comprising the steps of:

providing a tool for verifying that the documentation is proper;

inputting information to the tool that identifies a documentation format that is proper;

processing the documentation with the tool to verify whether the documentation is proper, said tool using the input information in verifying whether the documentation is proper;

generating output from the tool that indicates whether the documentation is proper;

preventing the job form being processed when the output form the tool indicates that the documentation is not verified as proper; and providing a bypass for enabling the job to be processed when the output from the tool indicates that the documentation is not verified as proper.

18. The computer-readable medium of claim 17 wherein the program instructions are job control language (JCL) instructions.

* * * * *